United States Patent
Zhang et al.

(10) Patent No.: US 12,253,976 B1
(45) Date of Patent: Mar. 18, 2025

(54) BATCH-TYPE IMAGE DISTRIBUTION METHOD BASED ON IPFS, SYSTEM AND STORAGE MEDIUM

(71) Applicant: NANJING UNIVERSITY OF POSTS AND TELECOMMUNICATIONS, Nanjing (CN)

(72) Inventors: Dengyin Zhang, Nanjing (CN); Jiawei Gu, Nanjing (CN); Zijie Liu, Nanjing (CN); Can Chen, Nanjing (CN); Yi Cheng, Nanjing (CN)

(*) Notice: Subject to any disclaimer, the term of this patent is extended or adjusted under 35 U.S.C. 154(b) by 0 days.

(21) Appl. No.: 18/812,218

(22) Filed: Aug. 22, 2024

Related U.S. Application Data

(63) Continuation of application No. PCT/CN2024/109829, filed on Aug. 5, 2024.

(30) Foreign Application Priority Data

Apr. 24, 2024 (CN) .......................... 202410495278.4

(51) Int. Cl.
G06F 7/00 (2006.01)
G06F 16/13 (2019.01)
G06F 16/172 (2019.01)

(52) U.S. Cl.
CPC .......... *G06F 16/172* (2019.01); *G06F 16/137* (2019.01)

(58) Field of Classification Search
CPC .............................. G06F 16/172; G06F 16/137
See application file for complete search history.

(56) References Cited

U.S. PATENT DOCUMENTS

| | | | | |
|---|---|---|---|---|
| 6,625,581 B1* | 9/2003 | Perkowski | ......... | G06Q 30/0234 709/200 |
| 6,961,712 B1* | 11/2005 | Perkowski | ......... | G06Q 30/0601 709/200 |
| 7,516,094 B2* | 4/2009 | Perkowski | ......... | G06Q 30/0641 705/26.4 |
| 7,650,376 B1* | 1/2010 | Blumenau | ........... | H04L 67/1008 709/217 |
| 8,819,106 B1* | 8/2014 | Sirota | ..................... | G06F 9/485 709/227 |
| 9,329,909 B1* | 5/2016 | Khanna | ............... | H04L 67/1029 |
| 11,388,220 B2* | 7/2022 | Xie | ..................... | H04L 67/1097 |

(Continued)

FOREIGN PATENT DOCUMENTS

| | | |
|---|---|---|
| CN | 108667884 A | 10/2018 |
| CN | 115422127 A | 12/2022 |

*Primary Examiner* — Mohammed R Uddin

(57) ABSTRACT

The present application discloses a batch-type image distribution method based on an IPFS, which includes: obtaining a list of cluster nodes needed to download images; calculating a caching ratio of an image layer of images to be distributed of each node, comparing the caching ratio of each node with a threshold of a preset node, and obtaining a complete image from an image repository; adding the node with the complete image to a list of source nodes, and adding remaining nodes needed to download images to a list of demand nodes, and constructing an IPFS network, and exporting and sharing the image; calculating target demand nodes using an optimization algorithm, and inputting the target demand nodes into the IPFS network for image download, and importing the downloaded image into a container and starting the container.

9 Claims, 7 Drawing Sheets

(56) References Cited

U.S. PATENT DOCUMENTS

2006/0011716 A1* 1/2006 Perkowski ............. G06Q 30/02
  235/375
2007/0285429 A1* 12/2007 Florent .................... G06T 1/20
  345/506

* cited by examiner ic # BATCH-TYPE IMAGE DISTRIBUTION METHOD BASED ON IPFS, SYSTEM AND STORAGE MEDIUM

CROSS-REFERENCE TO RELATED APPLICATIONS

The present application claims priority to Chinese Patent Application No. 2024104952784, filed Apr. 24, 2024, the entire disclosure of which is incorporated herein by reference.

TECHNICAL FIELD

The present application involves a batch-type image distribution method based on an IPFS, a system and a storage medium, and belongs to the field of cloud container technology.

BACKGROUND

In container clusters, with the expansion of service scale, tasks need to be scheduled to multiple different nodes to achieve load balancing and efficient resource utilization, so that multiple nodes need to download the same container image. In task scenarios with strict requirements on service response speed, such as promotional activities of e-commerce platforms and the release of new hot content by streaming media services, the speed of image distribution becomes the key to affecting the quality of service, and these task scenarios need to reduce the user's waiting time while guaranteeing the gradual expansion of the service scale. At the initial stage, the cluster needs a small number of nodes to quickly start containers to cope with the early traffic in order to quickly respond to the sudden increase in the number of user visits and avoid users waiting for too long, while at the subsequent stage, in order to meet the growing traffic demand, it is necessary to ensure that most of the remaining nodes can also be started at a faster speed.

However, when the default image distribution method is applied to the above scenarios, multiple nodes download images from the central image repository in parallel, which may lead to congestion in the network resources of the image repository, thereby affecting the download speed and service startup latency of each node, thus it is particularly unfavorable in this highly concurrent and fast-scaling scenario. In order to solve the network congestion problem of the central repository, Peer-to-Peer (P2P) transmission protocols are generally used in the industry, such as traditional IPFS, for image distribution, so that the image data can be directly transmitted between nodes, thereby reducing the dependence on the central image repository and improving the overall download speed.

In the image distribution scenario, although the traditional initial InterPlanetary File System (TPFS) image distribution process improves the overall distribution speed of images, it is unable to meet the rapid response needs of some nodes, and there are still deficiencies in transmission efficiency and robustness. First, the P2P transmission method improves the speed of image distribution on the whole, but all nodes almost complete the image download and start the service of container at the same moment, so that the service is always unavailable in the initial period of time, which increases the user's waiting time and affects the quality of the service to a certain extent. Second, IPFS needs to find out the nodes that possess the required images through the Distributed Hash Table (DHT) level by level in the network when transmitting the images, especially in the case of a relatively small number of source nodes, and most of the nodes in the cluster only act as the intermediate nodes for routing and forwarding, such nodes occupy the main part of the network, which not only cannot provide the required files, but also have to make the topology of the network more huge and complex, thereby resulting in a slower discovery of the nodes. Finally, a large number of demand nodes in the initial downloading stage can only obtain the image blocks from a limited download sources, which leads to competition among downloaders for the network resources of the source node, and the transmission quality is easily affected by the fluctuation of the initial node's network.

In addition, although IPFS enables nodes to share the required file blocks instantly after downloading, so that subsequent download requests have more download sources, the download order of the image blocks is randomized, so that it is difficult to guarantee that the required file blocks exist on multiple nodes, and when the initial source node exits the cluster, other nodes are unable to obtain the remaining required file blocks, which leads to a blockage in the transmission process.

SUMMARY

An object of the present application is to overcome the deficiencies in the related art and provide a batch-type image distribution method based on an IPFS, a system and a storage medium, to solve the problem of slower transmission speed and longer transmission delay due to competition of bandwidth.

In order to solve the above technical problems, the present application is realized using the following technical solutions:

According to a first aspect, the present application provides a batch-type image distribution method based on an IPFS, which includes:

using a container orchestration engine to obtain a container scheduling result, and obtaining a list of cluster nodes needed to download images based on the container scheduling result;

based on the list of cluster nodes, calculating a caching ratio of an image layer of images to be distributed that each node already has owned, comparing the caching ratio of each node with a threshold of a preset node, and selecting a node with the caching ratio greater than the threshold to obtain a complete image from an image repository;

adding the node with the complete image in the list of cluster nodes to a list of source nodes, and adding remaining nodes needed to download images in the list of cluster nodes to a list of demand nodes, and constructing an initial InterPlanetary File System (IPFS) network based on each node in the list of source nodes, and exporting and sharing the image based on the IPFS network;

calculating target demand nodes using an optimization algorithm, and inputting the target demand nodes in a batch into the IPFS network for image download according to results of the optimization algorithm, and importing the downloaded image into a container and starting the container; and removing a demand node that downloads the image completely and currently from the list of demand nodes and adding the removed demand node to the list of source nodes, and continuing image download of demand nodes in a next batch until the list of demand nodes is empty and the image download of all demand nodes are completed.

In one embodiment, the calculating the caching ratio of the image layer of images to be distributed that each node already has owned includes:

obtaining image layer information cached by each node in the list of cluster nodes needed to download images and image layer information of the images to be distributed, wherein the image layer information comprises a digest of the image layer and a size of the image layer; and comparing the digest of the image layer cached by each node in the list of cluster nodes needed to download images with the digest of the image layer of the images to be distributed, to determine whether there is an image layer caching of the images to be distributed in the each node in the list of cluster nodes; and in response to that some nodes have the image layer caching of the images to be distributed, calculating the caching ratio of the image layer of the images to be distributed based on the size of the image layer.

In one embodiment, the obtaining the image layer information includes:

obtaining a corresponding image manifest file from the image repository based on an image name and a version number, and extracting the image layer information based on the image manifest file.

In one embodiment, the caching ratio of the image layer of the images to be distributed is calculated by a formula:

$$R_i = \frac{\sum_{j=1}^{N} S_j * H_j}{\sum_{j=1}^{N} S_j},$$

$R_i$ denotes the caching ratio of a node i; N denotes a total number of image layers; $S_j$ denotes the size of a jth image layer; and $H_j$ denotes whether the jth image layer is cached on the node i.

In one embodiment, when none of ratios of the image layers of the images to be distributed is greater than the threshold of the preset node, any one of the nodes is arbitrarily selected to obtain the complete images from the image repository.

In one embodiment, the exporting and sharing the image based on the IPFS network includes:

each node in the list of source nodes starting an IPFS daemon process; and a container runtime of each node in the list of source nodes exporting the image when, and sharing the image to the IPFS network by an add instruction.

In one embodiment, the adding the demand node into the IPFS network for image download includes:

using a bandwidth detection tool to obtain an upload bandwidth of each node in the list of source nodes and a download bandwidth of each node in the list of demand nodes;

calculating the target demand nodes transmitted in a current batch using the optimization algorithm;

the target demand nodes adding an internet protocol (IP) address and a network identification (ID) of each node in the list of source nodes to the IPFS network; and the target demand nodes starting an IPFS daemon process and downloading a required image based on a hash value of the image and an get instruction.

In one embodiment, the target demand nodes for transmission in the current batch are calculated by a formula:

$$\text{minimize}\left(\alpha \frac{\sum_{i=1}^{N} \frac{S(1-R_i)}{D_i} X_i}{\sum_{i=1}^{N} X_i} + \beta \left(\sum_{j=1}^{M} B_j - \sum_{i=1}^{N} D_i X_i\right)\right)$$

N denotes a number of demand nodes; M denotes a number of current source nodes; $D_i$ denotes the download bandwidth of a demand node i; $B_j$ denotes the upload bandwidth of a source node j; S denotes the size of the image required by the node; $R_i$ denotes the caching ratio of the image layer that the demand node i has; $X_i$ denotes a decision variable of whether the demand node i needs to download images in the current batch; α denotes a weighted value of an average download delay; and β denotes a weighted value of a bandwidth of the source node that is not used.

According to a second aspect, the present application also provides a batch-type image distribution system based on the IPFS, which includes:

a node list acquisition module, configured for using a container orchestration engine to obtain a container scheduling result, and obtaining a list of cluster nodes needed to download images based on the container scheduling result;

a node information collection module, configured for based on the list of cluster nodes, calculating a caching ratio of an image layer of images to be distributed that each node already has owned, comparing the caching ratio of each node with a threshold of a preset node, and selecting a node with the caching ratio greater than the threshold to obtain a complete image from an image repository;

a strategy execution module, configured for adding the node with the complete image in the list of cluster nodes to a list of source nodes, and adding remaining nodes needed to download images in the list of cluster nodes to a list of demand nodes, and constructing an initial InterPlanetary File System (IPFS) network based on each node in the list of source nodes, and exporting and sharing the image based on the IPFS network;

a distribution coordination module, configured for calculating target demand nodes using an optimization algorithm, and inputting the target demand nodes in a batch into the IPFS network for image download according to results of the optimization algorithm, and importing the downloaded image into a container and starting the container; and a list updating module, configured for removing a demand node that downloads the image completely and currently from the list of demand nodes and adding the removed demand node to the list of source nodes, and continuing image download of demand nodes in a next batch until the list of demand nodes is empty and the image download of all demand nodes are completed.

According to a third aspect, the present application also provides a computer-readable storage medium, on which a computer program is stored, the computer program when executed by a processor implements the method as mentioned in the first aspect.

Beneficial effects achieved by the present application compared to the related art:

The present application determines the cluster nodes that need to download images based on a container scheduling result, calculates the caching ratio of the image layer of the images to be distributed that each node already owns based on the list of cluster nodes, makes the nodes with the caching ratio greater than a preset threshold to obtain the complete image from the image repository. Since the nodes with the caching ratio greater than the preset threshold are selected, these nodes have a larger number of image layer caching, so as to construct a larger number of source nodes at a faster speed.

The optimization algorithm is used to calculate the target demand nodes, and the target demand nodes are input in a batch into the IPFS network for image transmission according to the results of the optimization algorithm, so that since the previous nodes have already obtained the complete images before new nodes are added to the IPFS network, these nodes can start the container earlier, thus speeding up the service response speed, and the subsequent demand nodes can stably download the required image files from the plurality of source nodes, thereby reducing competition of bandwidth resource for the same source node. In the later stage of IPFS transmission, by constantly updating the list of source nodes and the list of demand nodes, the number of source nodes occupies a high proportion, and new nodes can discover the source nodes with fewer queries and select the optimal transmission path, which improves the transmission efficiency.

DETAILED DESCRIPTION OF THE EMBODIMENTS

The following is a detailed description of the technical solution of the present application by means of the accompanying drawings and specific embodiments, and it should be understood that the embodiments of the present application and the specific features in the embodiments are detailed descriptions of the technical solution of the present application, rather than limitations on the technical solution of the present application, and that the embodiments of the present application and the technical features in the embodiments can be combined with each other without conflict.

The term "and/or" herein is merely a description of an association relationship of an associated object, indicating that three kinds of relationships may exist, for example, A and/or B, which may indicate: A; both A and B; and B. In addition, the character "/" herein generally indicates that two continuous associated objects are in an "or" relationship.

First Embodiment

Figure 1:
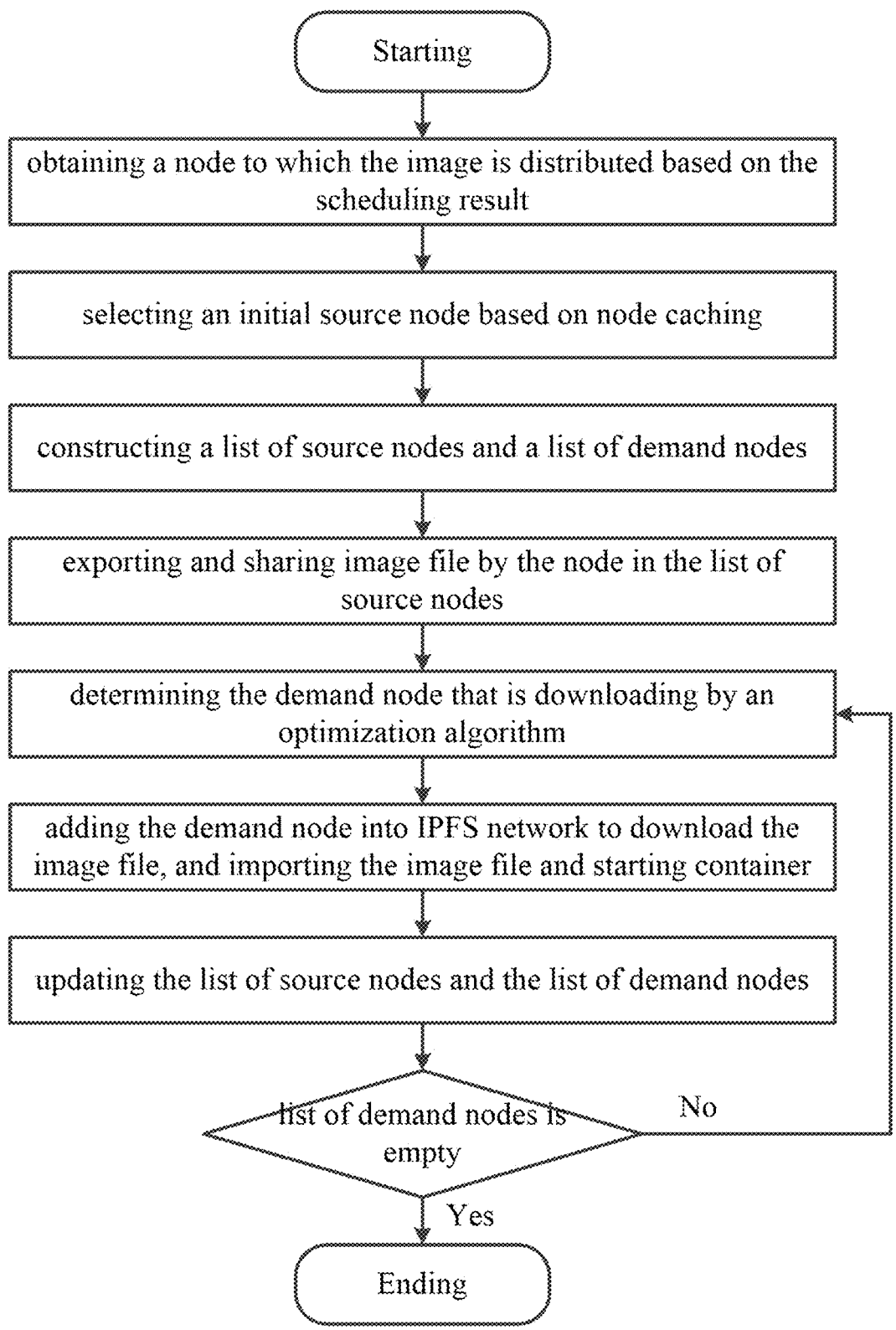
FIG. 1 is a flowchart of a batch-type image distribution method based on an IPFS provided by embodiments of the present application.

FIG. 1 is a flowchart of a batch-type image distribution method based on the IPFS in first embodiment of the present application. This flowchart merely illustrates the logical order of the method described in this embodiment, and the steps shown or described may be accomplished in a different order from that shown in FIG. 1 in other possible embodiments of the present application, without conflict with each other.

Figure 5:
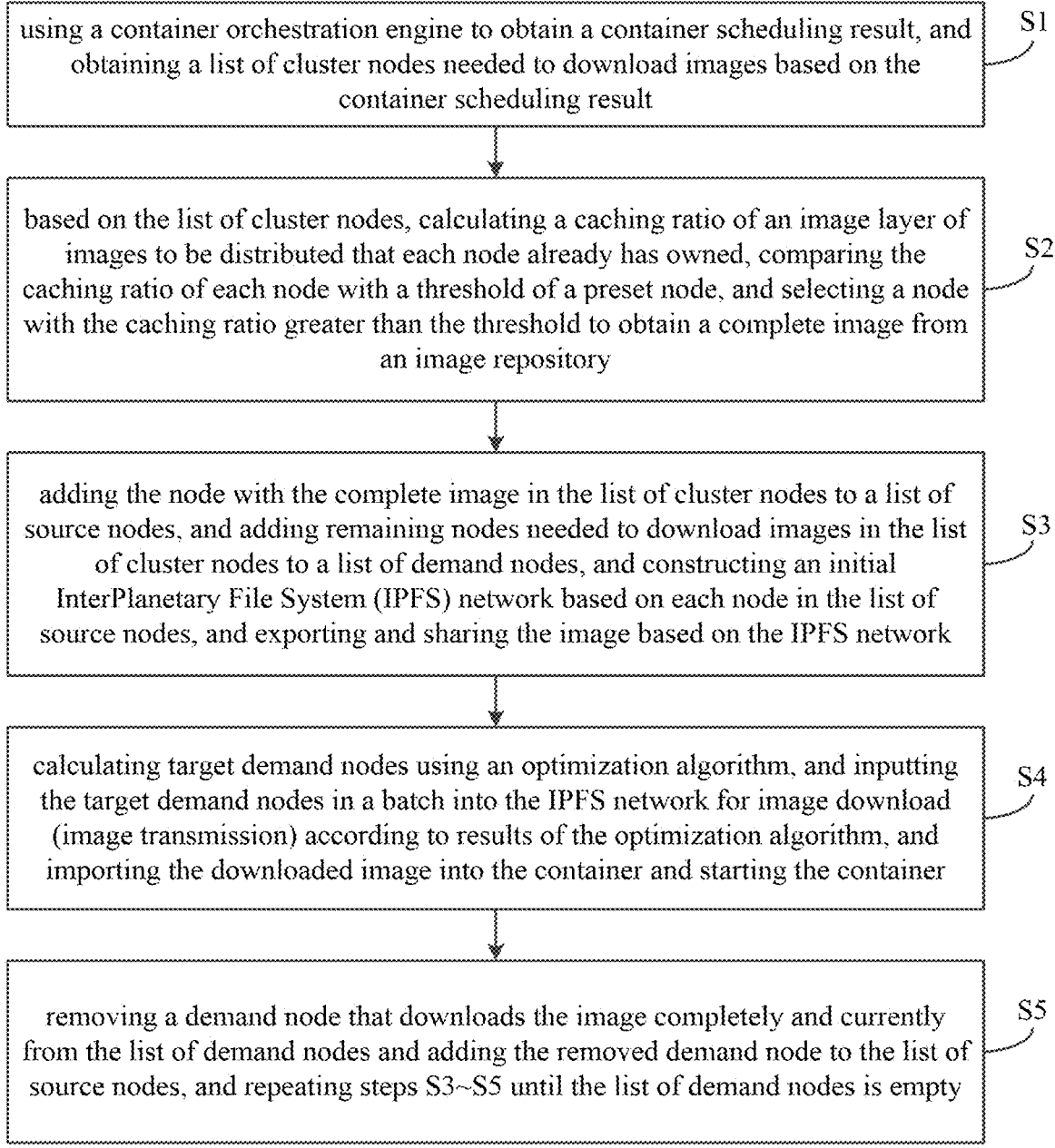
FIG. 5 is a flowchart of a batch-type image distribution system based on the IPFS provided by embodiments of the present application.

Referring to FIG. 1 and FIG. 5, the method of the present embodiment specifically includes:

Step S1: using a container orchestration engine to obtain a container scheduling result, and obtaining a list of cluster nodes needed to download images based on the container scheduling result.

Step S2: based on the list of cluster nodes, calculating a caching ratio of an image layer of images to be distributed that each node already has owned, comparing the caching ratio of each node with a threshold of a preset node, and selecting a node with the caching ratio greater than the threshold to obtain a complete image from an image repository.

Figure 6:
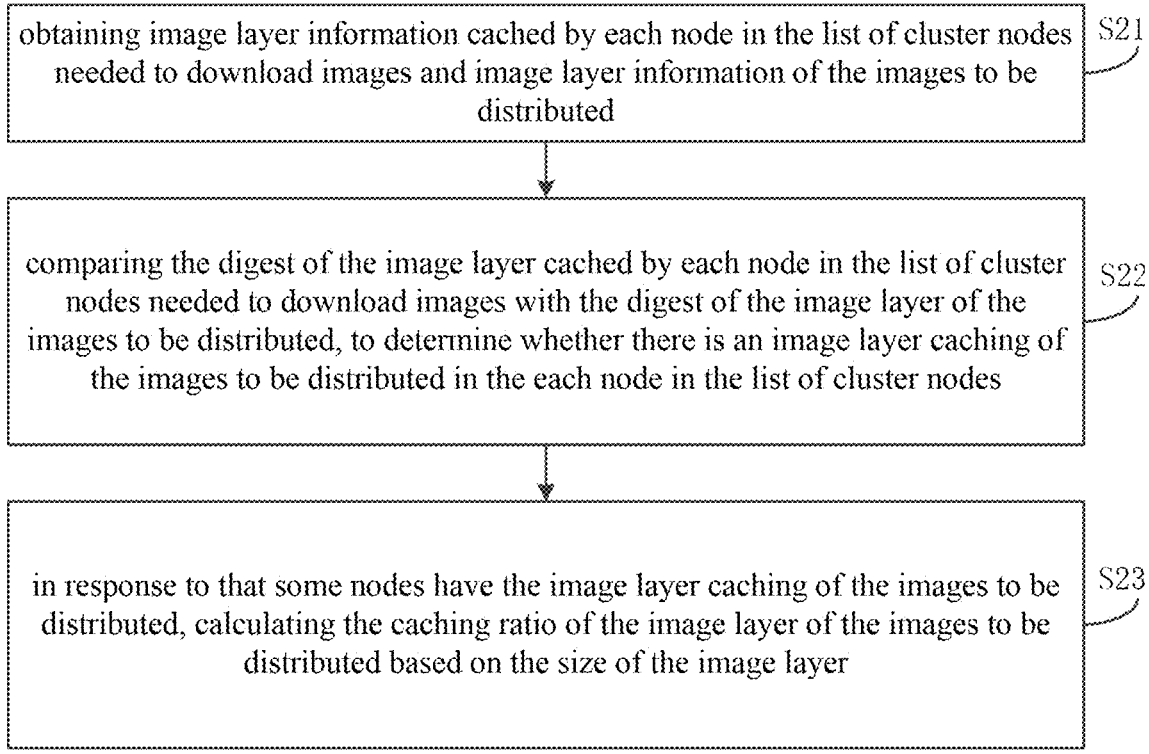
FIG. 6 is a flowchart of a batch-type image distribution system based on the IPFS provided by embodiments of the present application.

Specifically, as shown in FIG. 6, calculating the caching ratio of the image layer of the images to be distributed that each node already has owned includes:

Step S21: obtaining image layer information cached by each node in the list of cluster nodes needed to download images and image layer information of the images to be distributed.

The image layer information includes a digest of the image layer and a size of the image layer, the image layer digest indicates that a hash value is obtained by performing a hash operation on the image layer file, the hash value uniquely corresponds to the image layer, and the size of the image layer indicates that the image layer occupies a volume of storage.

In one embodiment, the obtaining the image layer information includes:

obtaining a corresponding image manifest file from the image repository based on an image name and a version number, and extracting the image layer information based on the image manifest file.

It should be noted that the image manifest file is generated when the image is stored in the image repository, the file includes image information metadata, and the image information metadata includes image layer information.

Step S22: comparing the digest of the image layer cached by each node in the list of cluster nodes needed to download images with the digest of the image layer of the images to be distributed, to determine whether there is an image layer caching of the images to be distributed in the each node in the list of cluster nodes.

Step S23: in response to that some nodes have the image layer caching of the images to be distributed, calculating the caching ratio of the image layer of the images to be distributed based on the size of the image layer.

The caching ratio of the image layer is calculated as follows:

$$R_i = \frac{\sum_{j=1}^{N} S_j * H_j}{\sum_{j=1}^{N} S_j} \quad (1)$$

$R_i$ denotes the caching ratio of a node i; N denotes a total number of image layers; $S_j$ denotes the size of a jth image layer; and $H_j$ denotes whether the jth image layer is cached on the node i.

The ratio is calculated by the formula (1), such that the node with the caching ratio greater than the preset threshold download the complete image from the image repository, and when none of caching ratios of the image layers is greater than the threshold of the preset node, any one of the nodes is arbitrarily selected to obtain the complete images from the image repository.

In practical application scenarios, in the initial stage of P2P transmission, the number of source nodes is small, so that other demand nodes can only download the required images from a limited number of source nodes, which leads to a certain degree of competition of bandwidth and makes the transmission speed slower. However, the image distribution method of the present application selects a node with a high amount of cache, i.e., a node with a caching ratio greater than the preset threshold obtain the complete image from the image repository, and adds the node with the complete image to the list of source nodes described in step S3 as an initial source node, so that as many initial source nodes as possible are selected in the initial stage of P2P transmission, and these selected nodes already have more image layer caching, so that the process of obtaining the complete image from the image repository is more rapid and the node that obtains the complete image can start the container earlier, which accelerates the response speed of the service.

Step S3: adding the node with the complete image in the list of cluster nodes to a list of source nodes, and adding remaining nodes needed to download images in the list of cluster nodes to a list of demand nodes, and constructing an initial InterPlanetary File System (IPFS) network based on each node in the list of source nodes, and exporting and sharing the image based on the IPFS network.

Specifically, each node in the list of source nodes starts the IPFS daemon process.

A container runtime of each node in the list of source nodes exports the image to be distributed, i.e., the required image file, and shares the image file to the IPFS network via an add instruction.

It should be noted that the network identification (ID) of the node is a unique identifier of the node, which is usually a long string, generated by the public key hash of the node, and is used for identification and communication, data verification, and network connection among nodes. After adding the network configuration information of the other nodes, the node can start the IPFS daemon process, which realizes communication, uploading, searching for, and downloading the files with configured other nodes, etc.

Figure 7:
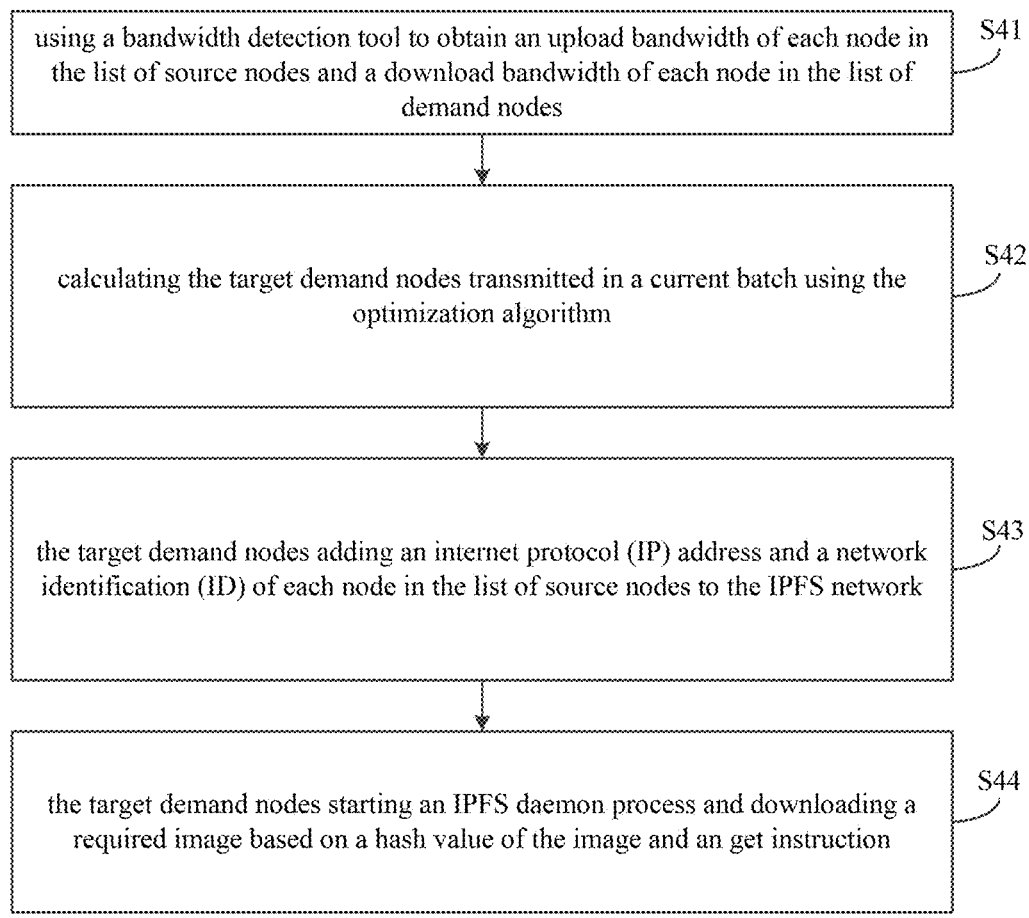
FIG. 7 is a flowchart of a batch-type image distribution system based on the IPFS provided by embodiments of the present application.

Step S4: calculating target demand nodes using an optimization algorithm, and inputting the target demand nodes in a batch into the IPFS network for image download (image transmission) according to results of the optimization algorithm, and importing the downloaded image into the container and starting the container;

Specifically, as shown in FIG. 7, the inputting the target demand node into the IPFS network for image download includes:

Step S41: using a bandwidth detection tool to obtain an upload bandwidth of each node in the list of source nodes and a download bandwidth of each node in the list of demand nodes;

Step S42: calculating the target demand nodes transmitted in a current batch using the optimization algorithm;

Step S43: the target demand nodes adding an internet protocol (IP) address and a network identification (ID) of each node in the list of source nodes to the IPFS network; and Step S44: the target demand nodes starting an IPFS daemon process and downloading a required image based on a hash value of the image and an get instruction.

The get instruction is used to retrieve and download the file from the IPFS network based on the content identifier of the file and utilizes the mechanism of content addressing to retrieve through the content of the file, such that the user can access and download any public file shared on the IPFS network.

It is to be noted that during the image transmission, if some nodes are unable to provide the image file for downloads due to failures and other reasons, the demand node can also download the image file from other nodes that have copies of the image file, thereby increasing the robustness of the transmission process.

In one embodiment, the target demand node is calculated by a formula as follows:

$$\text{minimize} \left( \alpha \frac{\sum_{i=1}^{N} \frac{S(1-R_i)}{D_i} X_i}{\sum_{i=1}^{N} X_i} + \beta \left( \sum_{j=1}^{M} B_j - \sum_{i=1}^{N} D_i X_i \right) \right) \quad (2)$$

N denotes a number of demand nodes; M denotes a number of current source nodes; $D_i$ denotes the download bandwidth of a demand node i; $B_j$ denotes the upload bandwidth of a source node j; S denotes the size of the image required by the node; $R_i$ denotes the caching ratio of the image layer that the demand node i has; $X_i$ denotes a decision variable of whether the demand node i needs to download images in the current batch; α denotes a weighted value of an average download delay; and β denotes a weighted value of a bandwidth of the source node that is not used.

In one embodiment, if the number of demand nodes is small, the optimal solution of formula (2) can be calculated by an exhaustive large method. If the number of demand nodes is large, the optimal solution of the formula (2) can be calculated by a heuristic algorithm, i.e., the download time is calculated based on the bandwidth of the demand node and the amount of required download, and based on the required download time, the nodes are added to the IPFS network for transmission in the order from low to high, until the download bandwidth of the demand node is higher than the upload bandwidth of the source node, and nodes are stopped being added to the IPFS network.

In one embodiment, a constraint that the download bandwidth of the demand node is less than the upload bandwidth of the source node is as follows:

$$\sum_{j=1}^{M} B_j \geq \sum_{i=1}^{N} D_i X_i \quad (3)$$

$$X_i \in \{0, 1\}, \forall i \in \{1, 2, \ldots, N\}$$

In the embodiment of the present application, the first half of an objective function is the average download delay required by the node, and the second half of the objective function is the bandwidth of the source node that is not used. In the image distribution method of the present application, in order to reduce the average transmission delay of the node, and utilize the upload bandwidth of the source node as much as possible, and to avoid wasting of the resources, the average download delay and the bandwidth of the source node that is not used are weighted, so that the value of the objective function is as small as possible. The constraint requires that the download bandwidth of the demand node currently counted for transmission in the network is less than the upload bandwidth of the source node, so as to avoid the competition and congestion of the network resources, and the final demand node obtained by the above formula 2 whether to carry out the download in this batch is decided by the decision variable $X_i$, if the decision variable of the node i is 1, the node i will be added to the IPFS network for transmission in this batch.

Step S5: removing a demand node that downloads the image completely and currently from the list of demand nodes and adding the removed demand node to the list of source nodes, and repeating steps S3-S5 until the list of demand nodes is empty.

Specifically, compared to the image distribution method of the traditional IPFS, which in extreme cases requires searching the entire cluster network to find the node that has the required image, thus leading to a longer transmission delay, the present application continuously updates the list of cluster nodes, adds only a small number of demand nodes in the initial stage of IPFS transmission, even though the number of source nodes in the cluster is small, so that the network nodes are simpler and the discovery of the node is more rapid. However, in the later stage of IPFS transmission, as the demand nodes that have finished downloading are continuously transferred to the list of source nodes, the number of source nodes also occupies a very high proportion, so that the newly added nodes can discover the source nodes through fewer queries. Among the many source nodes, a transmission path with a shorter distance and a better network condition is selected, so as to improve the efficiency of the transmission, and during the transmission, more and more nodes have a complete copy of the images instead of just a part of the file block, and even if some nodes are unable to provide the image file for download due to network failure or other reasons, the remaining nodes can download the image file from other nodes that have the copy of the image file, effectively increasing the robustness of the transmission process.

Second Embodiment

The present application provides an image distribution method applied in a Kubernetes cluster, which is implemented in the following environment: eight working nodes in the cluster need a particular image, each node uses docker as a container runtime, and the eight nodes are in the same Kubernetes cluster, the network conditions of each node are exactly the same, and the upload bandwidth is equal to the download bandwidth. Each node has deployed IPFS related components, and one of the nodes owns 60% of the image layer of the required image, while the other nodes do not need the relevant caching of the image.

Figure 8:
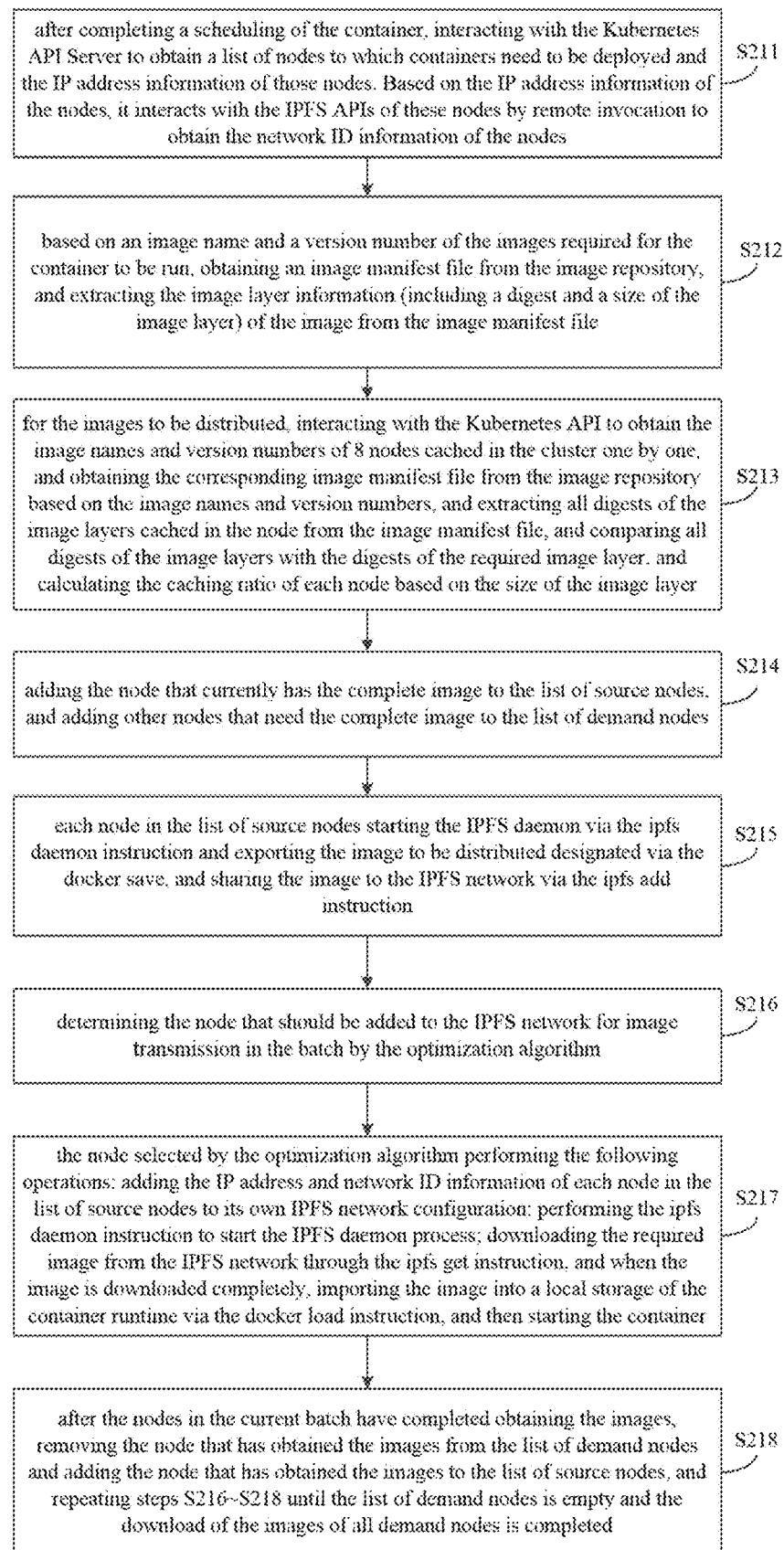
FIG. 8 is a flowchart of a batch-type image distribution system based on the IPFS provided by embodiments of the present application.

The specific image distribution steps are as follows, as shown in FIG. 8:

Step S211: after completing a scheduling of the container, interacting with the Kubernetes API Server to obtain a list of nodes to which containers need to be deployed and the IP address information of those nodes. Based on the IP address information of the nodes, it interacts with the IPFS APIs of these nodes by remote invocation to obtain the network ID information of the nodes.

Step S212: based on an image name and a version number of the images required for the container to be run, obtaining an image manifest file from the image repository, and extracting the image layer information (including a digest and a size of the image layer) of the image from the image manifest file.

Step S213: for the images to be distributed, interacting with the Kubernetes API to obtain the image names and version numbers of 8 nodes cached in the cluster one by one, and obtaining the corresponding image manifest file from the image repository based on the image names and version numbers, and extracting all digests of the image layers cached in the node from the image manifest file, and comparing all digests of the image layers with the digests of the required image layer, and calculating the caching ratio of each node based on the size of the image layer.

The docker pull instruction causes the node with the caching ratio more than 50% to download the complete image from the central image repository, and then the container is started.

Step S214: adding the node that currently has the complete image to the list of source nodes, and adding other nodes that need the complete image to the list of demand nodes.

Step S215: each node in the list of source nodes starting the IPFS daemon via the ipfs daemon instruction and exporting the image to be distributed designated via the docker save, and sharing the image to the IPFS network via the ipfs add instruction.

Step S216: determining the node that should be added to the IPFS network for image transmission in the batch by the optimization algorithm;

Step S217: the node selected by the optimization algorithm performing the following operations: adding the IP address and network ID information of each node in the list of source nodes to its own IPFS network configuration; performing the ipfs daemon instruction to start the IPFS daemon process; downloading the required image from the IPFS network through the ipfs get instruction, and when the image is downloaded completely, importing the image into a local storage of the container runtime via the docker load instruction, and then starting the container.

Step S218: after the nodes in the current batch have completed obtaining the images, removing the node that has obtained the images from the list of demand nodes and adding the node that has obtained the images to the list of source nodes, and repeating steps S216-S218 until the list of demand nodes is empty and the download of the images of all demand nodes is completed.

Figure 2:
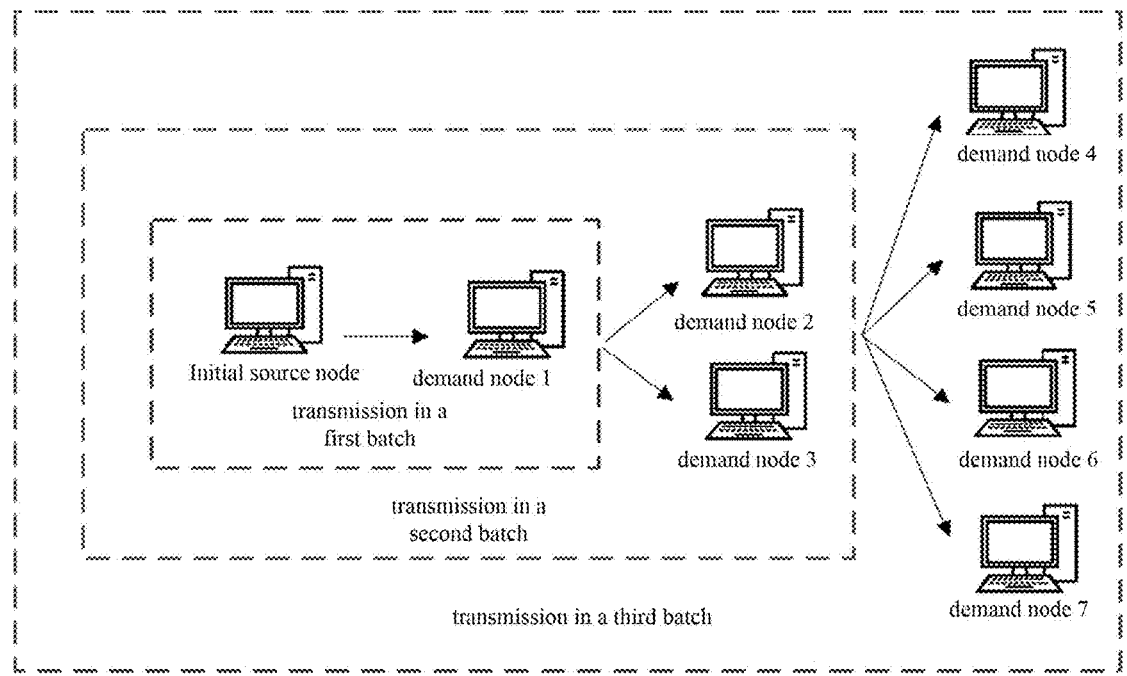
FIG. 2 is a schematic diagram of a batch-type image distribution method based on the IPFS provided by embodiments of the present application.

In the embodiment of the present application, since only a single node has the image layer caching greater 50% than the threshold, only this node initially obtains the complete image from the image repository and serves as the initial source node. The remaining seven nodes are then in the initial list of demand nodes. In addition, since the network conditions of each node are the same and the upload bandwidth is equal to the download bandwidth, when the nodes that need to be added in each batch are calculated through the optimization algorithm, an equal number of demand nodes are randomly selected to be added to the IPFS network for image transmission based on the original number of nodes in the network at this time. As shown in FIG. 2, initially there is only a single source node in the IPFS network, so that one demand node is added for image transmission in the first batch. After this node downloads the image, there are two source nodes in the IPFS network at this time, thus two demand nodes are added to in second batch for transmission, and similarly, the remaining four demand nodes are added in the third batch for transmission, and after the transmission of these nodes is completed, the image transmission of all demand nodes is completed.

Third Embodiment

Abatch-type image distribution system based on an IPFS, including:
a node information collection module, configured for based on the list of cluster nodes, calculating a caching ratio of an image layer of images to be distributed that each node already has owned, comparing the caching ratio of each node with a threshold of a preset node, and selecting a node with the caching ratio greater than the threshold to obtain a complete image from an image repository;
a strategy execution module, configured for adding the node with the complete image in the list of cluster nodes to a list of source nodes, and adding remaining nodes needed to download images in the list of cluster nodes to a list of demand nodes, and constructing an initial InterPlanetary File System (IPFS) network based on each node in the list of source nodes, and exporting and sharing the image based on the IPFS network;
a distribution coordination module, configured for calculating target demand nodes using an optimization algorithm, and inputting the target demand nodes in a batch into the IPFS network for image download according to results of the optimization algorithm, and importing the downloaded image into a container and starting the container; and
a list updating module, configured for removing a demand node that downloads the image completely and currently from the list of demand nodes and adding the removed demand node to the list of source nodes, and continuing image download of demand nodes in a next batch until the list of demand nodes is empty and the image download of all demand nodes are completed.

Figure 3:
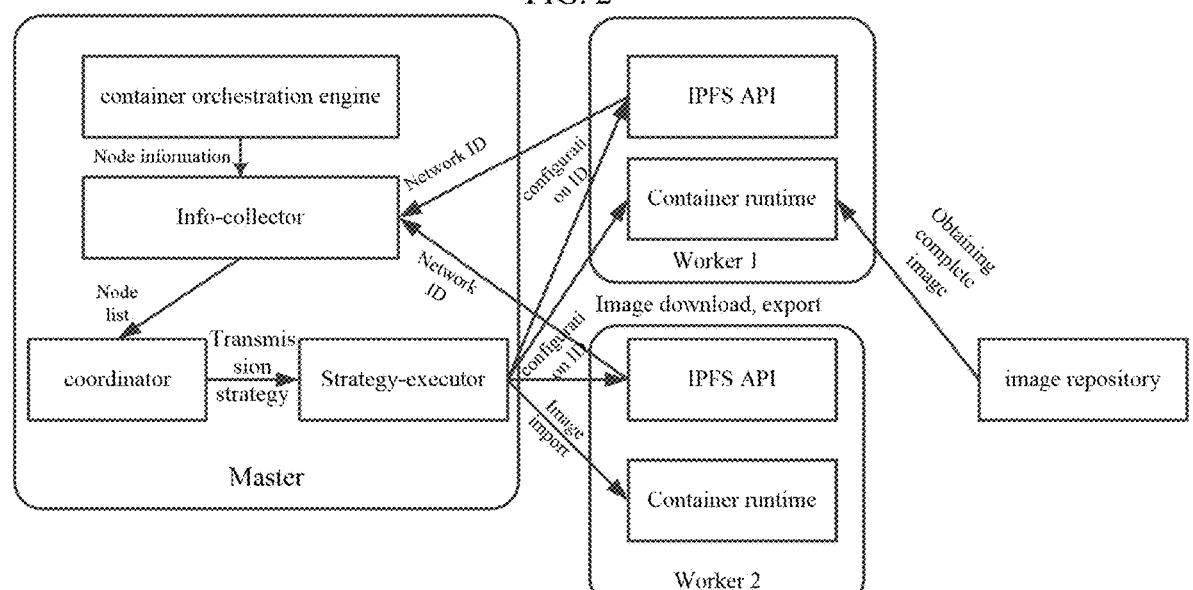
FIG. 3 is a block diagram of a batch-type image distribution system based on the IPFS provided by embodiments of the present application.

Specifically, referring to FIG. 3, the node list acquisition module includes a node list acquisition component for obtaining a list of cluster nodes needed to download images. The node information collection module includes a node information collection component for querying the IP address and the network ID of each node and calculating the caching ratio of the images to be distributed; and the distribution coordination module includes a distribution coordination component for real-time monitoring of changes in the number of source nodes and download conditions of images of the demand nodes, coordinating the distribution order of images of the nodes, and adding the demand nodes to the initial IPFS network in a batch, and the module is also required to perform the corresponding actions based on the strategy logic of the distribution coordination module, including notifying the demand nodes to add the IP and network ID of the source nodes to their own IPFS network configuration, starting the IPFS daemon, etc. The strategy execution module includes a strategy execution component for interacting with the IPFS API and the container runtime of the node to perform the configuration of the network, the export and import of the image, the startup of the IPFS service process, and the sharing of the image file operation according to the algorithmic logic. The list updating module includes a list updating component for updating the list of the source nodes and the demand nodes.

Figure 4:
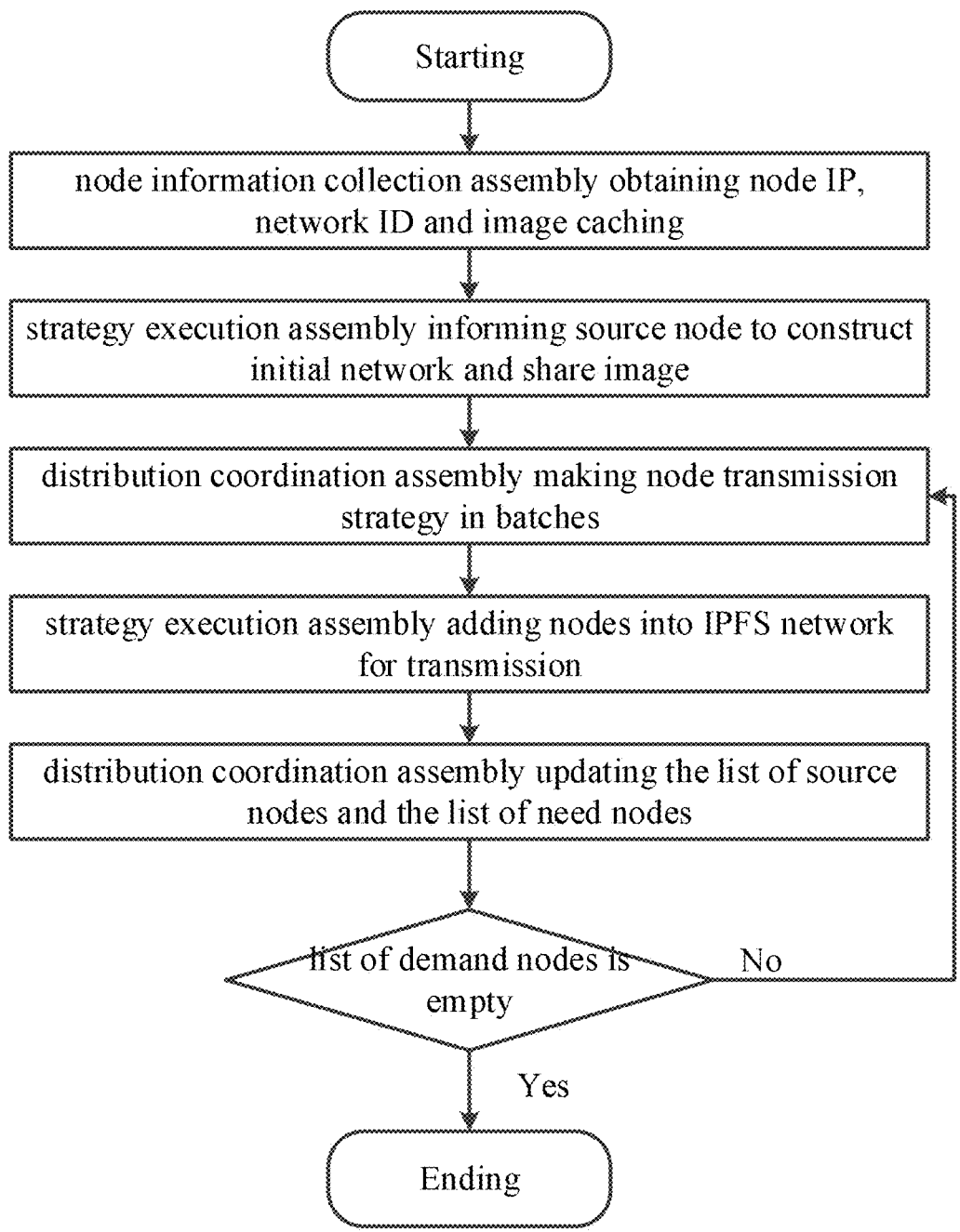
FIG. 4 is a flowchart of a batch-type image distribution system based on the IPFS provided by embodiments of the present application.

In one embodiment, referring to FIG. 4, when performing image distribution, the node information collection component interacts with the container orchestration engine to find the node that has the image and constructs a list of source nodes, and if each node in the list of cluster nodes has a complete image, a node is selected arbitrarily to obtain the complete image through the image repository; secondly, the strategy execution component interacts with the container runtime of the above node and the IPFS API through remote access to construct the initial IPFS network, and export and share the images (image files) to be distributed based on the IPFS network; then, the distribution coordination component determines the nodes to be transmitted in this batch, and notifies the strategy execution component to add the demand nodes to be transmitted in the current batch to the IPFS network for image transmission, and after the transmission is completed, the strategy execution component notifies the nodes in this batch to import the image file and start the container, and provides download services for the subsequent demand nodes; finally, the distribution coordination component updates the list of source nodes and the list of demand nodes, and repeats the above operation until the list of demand nodes is empty, and the images are obtained completely.

It is to be noted that the batch-type image distribution system based on IPFS provided by the present application can quickly obtain the IP information and image caching of each node, make the nodes that have the required images configure the network, start the transmission service, and share the images by remote access before transmission, and monitor the image download of each node in the cluster in real time during transmission, and quickly coordinates the download of subsequent nodes after the nodes in the same batch have completed their downloads, thereby effectively reducing the overhead caused by manual configuration.

Fourth Embodiment

This embodiment provides a computer-readable storage medium, on which a computer program is stored, the computer program, when executed by a processor, implements the method as described in first embodiment and the second embodiment.

It should be appreciated by those skilled in the art that embodiments of the present application may be provided as methods, systems, or computer program products. Thus, the present application may take the form of a fully hardware embodiment, a fully software embodiment, or an embodiment that combines software and hardware. Further, the present application may take the form of a computer program product implemented on one or more computer-usable storage media (including, but not limited to, a disk memory, a CD-ROM, optical memory, etc.) that contain computer-usable program code therein.

The present application is described with reference to flowcharts and/or block diagrams of methods, devices (systems), and computer program products according to embodiments of the present application. It should be understood that each of the processes and/or boxes in the flowchart and/or block diagram, and the combination of processes and/or boxes in the flowchart and/or block diagram, may be implemented by computer program instructions. These computer program instructions may be provided to a processor of a general-purpose computer, a special-purpose computer, an embedded processor, or other programmable data processing device to produce a machine, such that the instructions executed by the processor of the computer or other programmable data processing device produce a device for carrying out the functions specified in the one process or multiple processes of the flowchart and/or the one box or multiple boxes of the box diagram.

These computer program instructions may also be stored in computer-readable memory capable of directing the computer or other programmable data processing device to operate in a particular manner, such that the instructions stored in the computer-readable memory produce an article of manufacture comprising an instruction device that implements the function specified in the flowchart one process or a plurality of processes and/or the box diagram one box or a plurality of boxes.

These computer program instructions may also be loaded onto a computer or other programmable data processing device, such that a series of operational steps are performed on the computer or other programmable device to produce computer-implemented processing, such that the instructions executed on the computer or other programmable device provide steps for implementing the functionality specified in the flowchart one process or a plurality of processes and/or the box diagram one box or a plurality of boxes.

The foregoing is only a preferred embodiment of the present application, and it should be noted that, for those skilled in the art, a number of improvements and deformations may be made without departing from the technical principles of the present application, which shall also be considered to be within the scope of the present application.

What is claimed is:

1. A batch-type image distribution method based on an IPFS, applied to container clusters in a computer system, comprising:

using a container orchestration engine to obtain a container scheduling result, and obtaining a list of cluster nodes needed to download images based on the container scheduling result;

based on the list of cluster nodes, calculating a caching ratio of an image layer of images to be distributed that each node already has owned, comparing the caching ratio of each node with a threshold of a preset node, and selecting a node with the caching ratio greater than the threshold to obtain a complete image from an image repository;

adding the node with the complete image in the list of cluster nodes to a list of source nodes, and adding remaining nodes needed to download images in the list of cluster nodes to a list of demand nodes, and constructing an initial InterPlanetary File System (IPFS) network based on each node in the list of source nodes, and exporting and sharing the image based on the IPFS network;

calculating target demand nodes using an optimization algorithm, and inputting the target demand nodes in a batch into the IPFS network for image download according to results of the optimization algorithm, and importing the downloaded image into a container and starting the container; and removing a demand node that downloads the image completely and currently from the list of demand nodes and adding the removed demand node to the list of source nodes, and continuing image download of demand nodes in a next batch until the list of demand nodes is empty and the image download of all demand nodes are completed.

2. The batch-type image distribution method based on the IPFS according to claim 1, wherein calculating the caching ratio of the image layer of images to be distributed that each node already has owned comprises:

obtaining image layer information cached by each node in the list of cluster nodes needed to download images and image layer information of the images to be distributed, wherein the image layer information comprises a digest of the image layer and a size of the image layer; and comparing the digest of the image layer cached by each node in the list of cluster nodes needed to download images with the digest of the image layer of the images to be distributed, to determine whether there is an image layer caching of the images to be distributed in the each node in the list of cluster nodes; and in response to that some nodes have the image layer caching of the images to be distributed, calculating the caching ratio of the image layer of the images to be distributed based on the size of the image layer.

3. The batch-type image distribution method based on the IPFS according to claim 2, wherein obtaining the image layer information comprises:

obtaining a corresponding image manifest file from the image repository based on an image name and a version number, and extracting the image layer information based on the image manifest file.

4. The batch-type image distribution method based on the IPFS according to claim 2, wherein the caching ratio of the image layer of the images to be distributed is calculated by a formula:

$$R_i = \frac{\sum_{j=1}^{N} S_j * H_j}{\sum_{j=1}^{N} S_j}$$

wherein Ri denotes the caching ratio of a node i; N denotes a total number of image layers; Sj denotes the size of a jth image layer; and Hj denotes whether the jth image layer is cached on the node i.

5. The batch-type image distribution method based on the IPFS according to claim 4, wherein when none of caching ratios of the image layers of the images to be distributed is greater than the threshold of the preset node, any one of the nodes is arbitrarily selected to obtain the complete images from the image repository.

6. The batch-type image distribution method based on the IPFS according to claim 1, wherein exporting and sharing the image based on the IPFS network comprises:

each node in the list of source nodes starting an IPFS daemon process; and a container runtime of each node in the list of source nodes exporting the image, and sharing the image to the IPFS network by an add instruction.

7. The batch-type image distribution method based on the IPFS according to claim 1, wherein adding the demand node into the IPFS network for image download comprises:
   using a bandwidth detection tool to obtain an upload bandwidth of each node in the list of source nodes and a download bandwidth of each node in the list of demand nodes;
   calculating the target demand nodes transmitted in a current batch using the optimization algorithm;
   the target demand nodes adding an internet protocol (IP) address and a network identification (ID) of each node in the list of source nodes to the IPFS network; and
   the target demand nodes starting an IPFS daemon process and downloading a required image based on a hash value of the image and an get instruction.

8. The batch-type image distribution method based on the IPFS according to claim 7, wherein the target demand nodes for transmission in the current batch are calculated by a formula:

$$\text{minimize}\left(\alpha\frac{\sum_{i=1}^{N}\frac{S(1-R_i)}{D_i}X_i}{\sum_{i=1}^{N}X_i}+\beta\left(\sum_{j=1}^{M}B_j-\sum_{i=1}^{N}D_iX_i\right)\right)$$

wherein N denotes a number of demand nodes; M denotes a number of current source nodes; $D_i$ denotes the download bandwidth of a demand node i; $B_j$ denotes the upload bandwidth of a source node j; S denotes the size of the image required by the node; $R_i$ denotes the caching ratio of the image layer that the demand node i has; $X_i$ denotes a decision variable of whether the demand node i needs to download images in the current batch; $\alpha$ denotes a weighted value of an average download delay; and $\beta$ denotes a weighted value of a bandwidth of the source node that is not used.

9. A non-transitory computer-readable storage medium, on which a computer program is stored, wherein the computer program when executed by a processor implements the method according to claim 1.

* * * * *